United States Patent [19]

Morikawa et al.

[11] Patent Number: 5,173,893
[45] Date of Patent: Dec. 22, 1992

[54] DISC DOUBLE INSERTION PREVENTING MECHANISM FOR DISC PLAYER

[75] Inventors: Kiyoshi Morikawa; Masakazu Kurumada; Kazuo Kobayashi; Yoshinori Yamada; Masanori Sugihara, all of Saitama, Japan

[73] Assignee: Pioneer Electronic Corporation, Tokyo, Japan

[21] Appl. No.: 883,041

[22] Filed: May 7, 1992

Related U.S. Application Data

[63] Continuation of Ser. No. 487,506, Mar. 2, 1990.

[30] Foreign Application Priority Data

Mar. 3, 1989 [JP] Japan .................................. 1-52602

[51] Int. Cl.$^5$ ...................... G11B 17/04; G11B 31/00
[52] U.S. Cl. .................................. 369/77.1; 369/75.2
[58] Field of Search ................ 369/77.1, 77.2, 75.2, 369/75.1; 360/99.02, 99.03, 99.06, 99.07

[56] References Cited

U.S. PATENT DOCUMENTS

| | | | |
|---|---|---|---|
| 4,498,162 | 2/1985 | Schatteman | 369/77.1 |
| 4,507,768 | 3/1985 | Ikedo et al. | 369/77.1 |
| 4,561,085 | 12/1985 | Funabashi | 369/77.1 |
| 4,674,079 | 6/1987 | Agostini | 369/77.1 |
| 4,701,902 | 10/1987 | Aoyagi et al. | 369/77.1 |
| 4,733,387 | 3/1988 | Yoshimura | |
| 4,829,502 | 5/1989 | Aoyagi et al. | 369/77.1 |
| 5,022,023 | 6/1991 | Toyoguchi | 369/77.1 |

FOREIGN PATENT DOCUMENTS

| | | |
|---|---|---|
| 0091098 | 3/1983 | European Pat. Off. |
| 166381 | 1/1986 | European Pat. Off. |
| 3139333 | 4/1982 | Fed. Rep. of Germany |
| 3314400 | 11/1983 | Fed. Rep. of Germany |
| 3316091 | 11/1983 | Fed. Rep. of Germany |
| 3402491 | 8/1984 | Fed. Rep. of Germany |
| 3443070 | 6/1985 | Fed. Rep. of Germany |
| 3515437 | 11/1986 | Fed. Rep. of Germany |
| 8304132 | 11/1983 | PCT Int'l Appl. |
| 2073471 | 3/1981 | United Kingdom |
| 2087128 | 9/1981 | United Kingdom |
| 2127205 | 4/1984 | United Kingdom |

Primary Examiner—Stuart S. Levy
Assistant Examiner—Joseph A. Rhoa
Attorney, Agent, or Firm—Sughrue, Mion, Zinn, Macpeak & Seas

[57] ABSTRACT

A disc player is disclosed which includes a casing having a disc inserting opening, a turntable driven by a spindle motor, a clamper arm operating means for operating a clamper arm in cooperation with said turntable, a centering mechanism for guiding a disc from the disc inserting opening onto the turntable, the centering mechanism including a pair of centering arms (13, 14) each having at distal end portions contact portions which are to be brought into contact with a circumferential edge of the disc, the centering arms being pivotally movable at a predetermined distance in the disc inserting opening, a detecting lever (42) for detecting a condition that the disc is laid on the turntable, and a disc double insertion preventing lock linkage (43, 57) for preventing another disc from being inserted into the casing through the disc inserting opening when the first-mentioned disc is already located on the turntable, the double insertion preventing lock linkage being in cooperation with the centering mechanism.

10 Claims, 6 Drawing Sheets

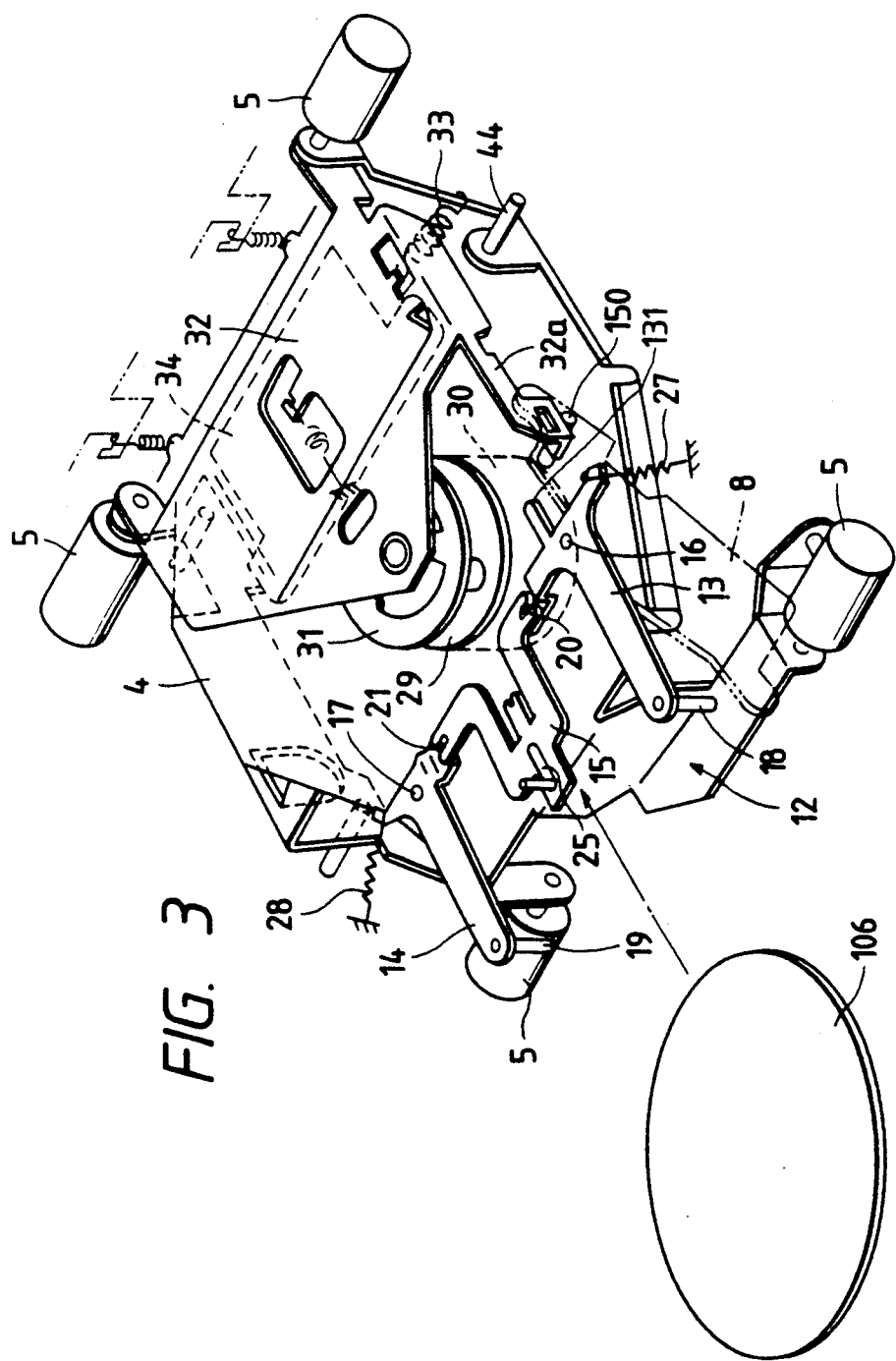

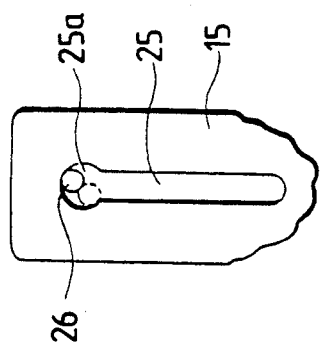
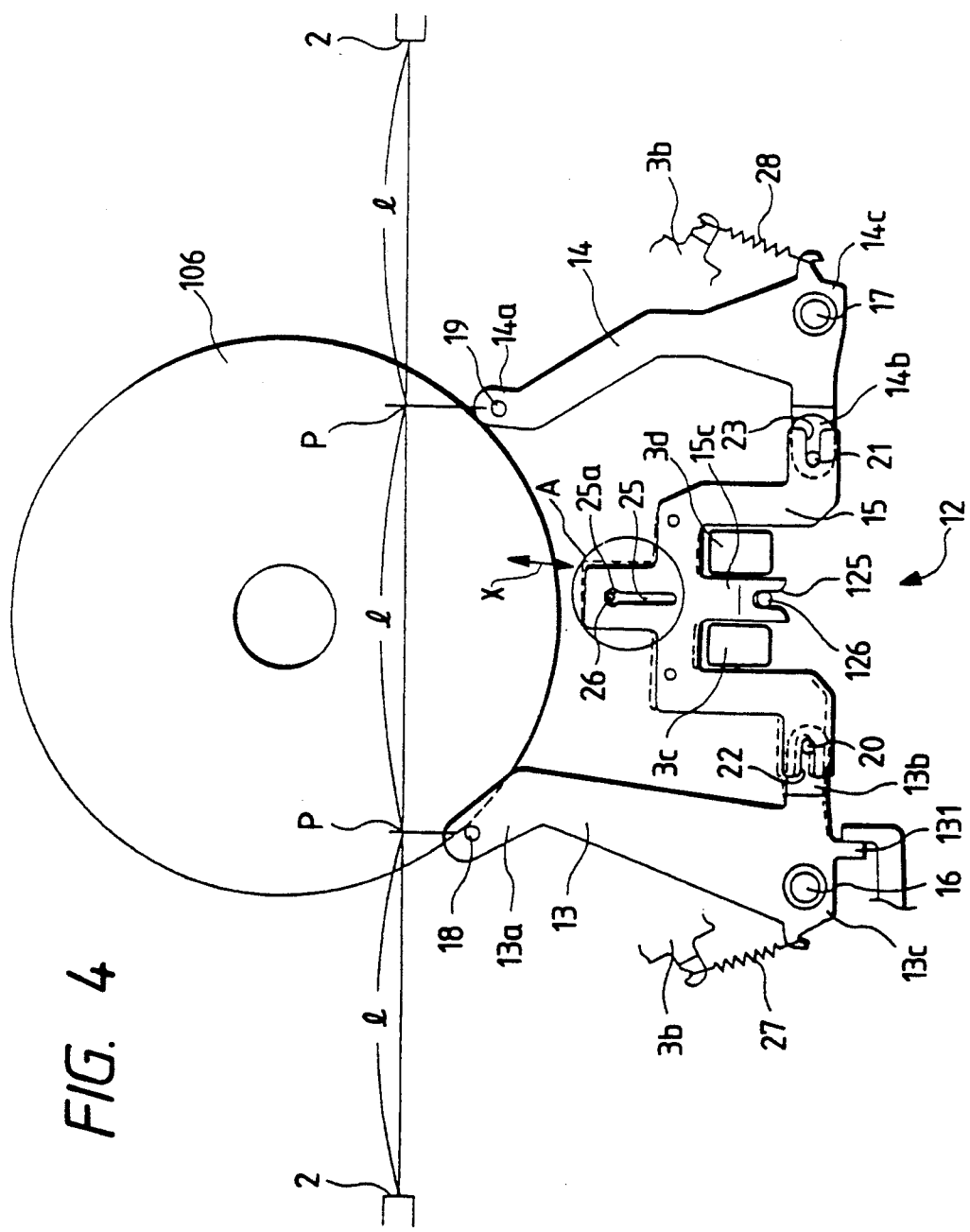

DISC DOUBLE INSERTION PREVENTING MECHANISM FOR DISC PLAYER

This is a continuation of application Ser. No. 07/487,506 filed Mar. 2, 1990 now abandoned.

BACKGROUND OF THE INVENTION

This invention relates to a disc player with a centering mechanism which, in inserting a disc into the disc inserting opening thereof, operates to position the disc at the s center of the disc inserting opening. In particular, it relates to a disc-double insertion preventing mechanism.

Recently, a compact disc has been developed which has a recording layer having pits corresponding to digital signals obtained by converting analog sounds (hereinafter referred merely as "a disc", when applicable). With the disc, analog sounds are optically reproduced by using a laser beam applied by the reading head of a CD (compact disc) player. The disc is much superior both in tone quality and in operability to conventional LP record discs. Hence, the compact disc together with its CD player has quickly come into wide use. Accordingly, CD players to be mounted on vehicles have been developed (hereinafter referred to as "vehicle disc players", when applicable). One example of the vehicle disc players is as shown in FIG. 1. In FIG. 1, reference numeral 101 designates a disc 12 cm in diameter in which pieces of music have been recorded. When the disc 101 is inserted into a disc inserting opening 102, it is conveyed to a predetermined position (which is substantially the center of the CD player) by a loading mechanism 103, where it is fixedly mounted on the turntable 105 by a clamper arm 104. The disc 101 thus mounted is rotated by a spindle motor (not shown), so that the pieces of music are reproduced with a reading head (not shown).

On the other hand, a disc 106 of 8 cm in diameter, which is much smaller in diameter than the disc 101 of 12 cm in diameter, has been proposed in the art.

The above-described conventional vehicle CD player suffers from the following difficulties: It is rather difficult to insert a disc into the wide disc inserting opening 102 at the middle, since the opening 102 is formed for the large diameter disc, and therefore it is necessary to use the centering mechanism. Particularly when the player is mounted on a travelling vehicle, it is further difficult to insert the 8 cm disc into the disc inserting opening 102 at the middle, because of the vibration of the vehicle.

This difficulty may be eliminated by provision of the centering mechanism which moves the disc 106 to the middle of the disc inserting opening 102 if it is shifted therefrom. Such a mechanism may be provided in the vicinity of the disc inserting opening 102.

On the other hand, in the vicinity of the disk inserting opening 102, there is a disc double loading preventing member 108 for preventing a new disc from being inserted into the player when the player already receives the other disk. The double loading preventing member 108 is driven to pivot in the directions of arrow W by an opening/closing mechanism 107 provided on a side opposite to the loading mechanism 103. With such a mechanism, during the playback of the CD player, the double loading preventing member 108 is driven by the opening/closing mechanism 107 to thereby close the disk inserting opening 102 to prevent another disc from being inserted erroneously.

However, such a conventional system suffers from a disadvantage such that the overall mechanism of the CD player would be complicated due to the provision of the centering mechanism, the other independent double loading preventing member 108 and the opening/closing mechanism 107. This would increase a manufacture cost. Also, it is difficult to enhance a mechanical reliability of the operation.

SUMMARY OF THE INVENTION

In view of the foregoing, an object of this invention is to provide a disc player in which, even if the disc player is greatly vibrated during the traveling of the vehicle, each of the small and large diameter discs can be readily inserted into the disc inserting opening at the middle, and the centering mechanism is well used also for preventing a disc double loading preventing mechanism.

The foregoing object of the invention has been achieved by the provision of a vehicle disc player.

A vehicle disc player is, in general, on the front panel or the like of the vehicle. Therefore, the vehicle disc player is vibrated during traveling of the vehicle. Therefore, it is rather troublesome for the operator to insert a smaller diameter disc into the disc inserting opening at the middle; that is, he cannot position the disc at the middle of the disc s inserting opening without turning his attention to it. However, since the centering mechanism is provided near the disc inserting opening, the disc can be readily positioned at the middle of the disc inserting opening with the aid of the centering pins of the centering mechanism.

According to the invention, there is provided a disc player comprising: a casing having a disc inserting opening; a turntable driven by a spindle motor; a clamper arm operation means for operating a clamper arm in cooperation with the turntable; a centering means for guiding a disc from the disc inserting opening onto the turntable; the centering means including a pair of centering arms each having at distal end portions contact portions which are to be brought into contact with a circumferential edge of the disc, the centering arms being pivotally movable at a predetermined distance in the disc inserting opening; detecting means for detecting a condition that the disc is laid at a predetermined position within the casing; and disc double insertion preventing lock means for preventing another disc from being inserted into the casing through the disc inserting opening when the first-mentioned disc is already located at the predetermined position within the casing, the double insertion preventing lock means being in cooperation with the centering means.

According to another aspect of the invention, the disc player further comprises a centering lever means for allowing the pair of centering arms to be pivotally opened when the circumferential edge of the disc is simultaneously brought into contact with the contact portions of the centering arms and for locking the pair of centering arms when the circumferential edge of the disc is brought into contact with only one of the contact portions of the centering arms.

Also, according to the invention, the double insertion preventing means includes a linkage means having a first link and a second link, the first link is pivotally coupled to said detecting means and the second link having a claw for engaging with one of the centering means and the centering lever means.

BRIEF DESCRIPTION OF THE DRAWINGS

FIG. 3 is a perspective view showing a supporting frame with a centering mechanism;

FIG. 4 is a plan view of the centering mechanism;

FIG. 5 is an enlarged view of the part A in FIG. 4;

DESCRIPTION OF THE PREFERRED EMBODIMENTS

One embodiment of this invention will be described with reference to the accompanying drawings. FIGS. 2 through 9 show one example of a vehicle CD player according to the invention.

Figure 1:
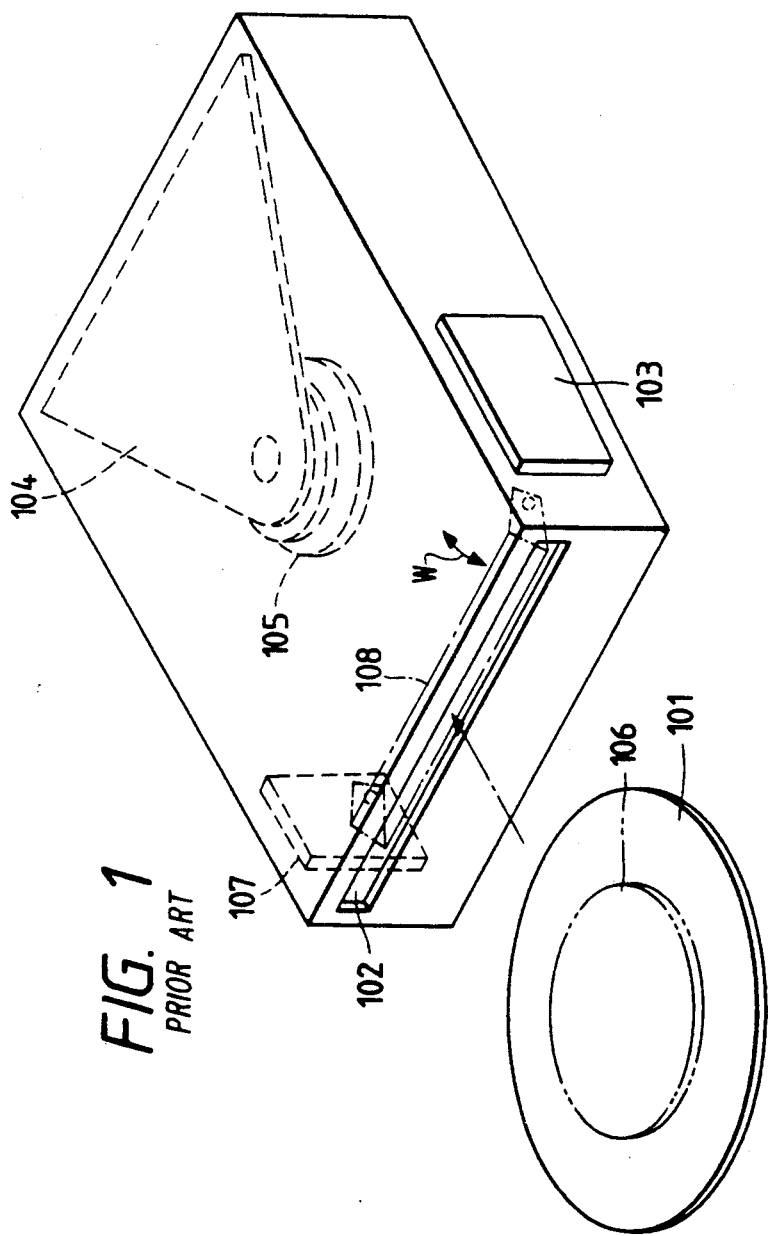
FIG. 1 is a perspective view of a conventional vehicle CD player.
Figure 2:
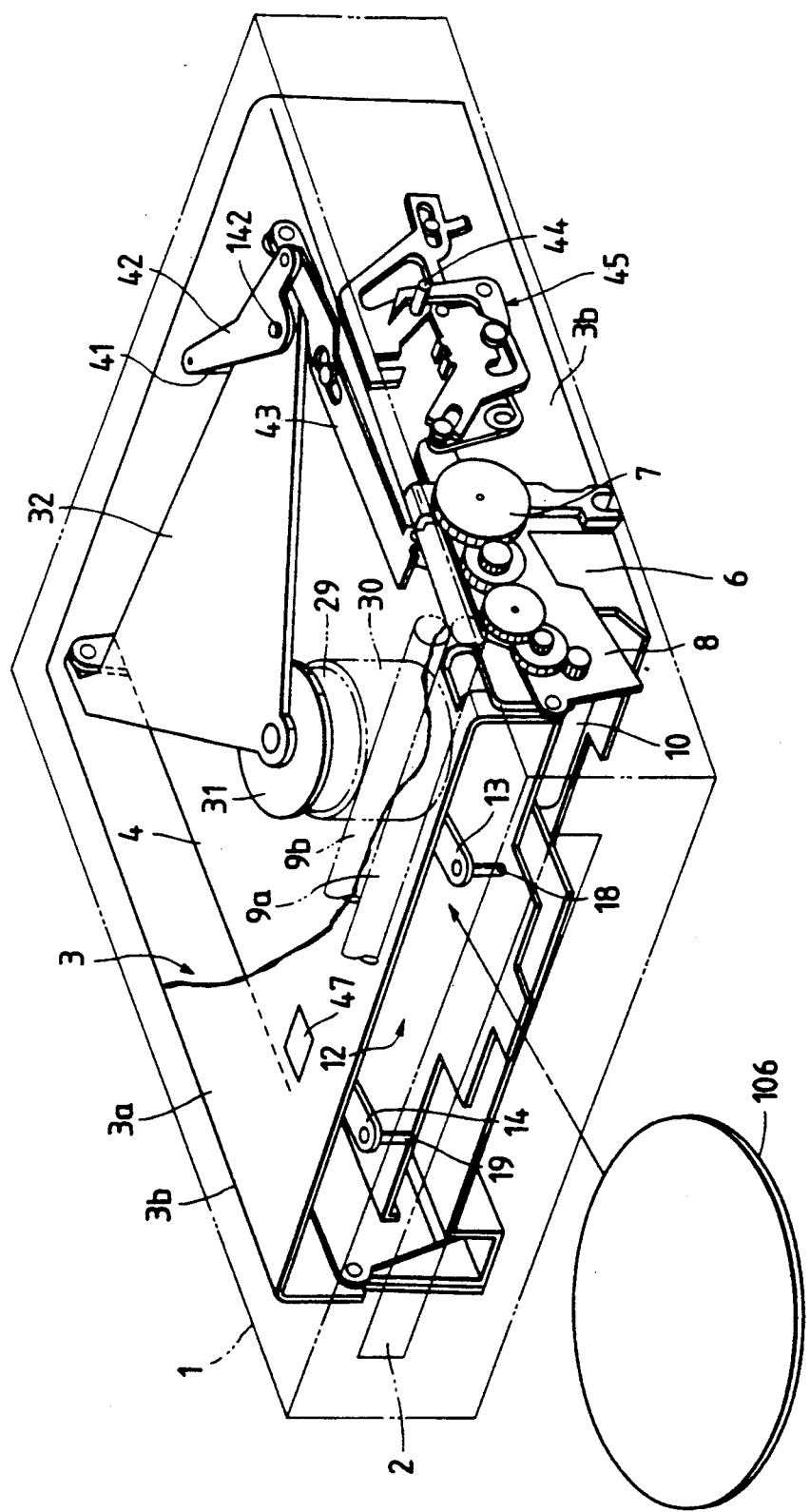
FIG. 2 is a perspective view showing one example of a vehicle CD player according to this invention.

In FIG. 2, reference numeral 1 designates the casing of the vehicle CD player according to the invention. A disc inserting opening 2 is formed in the front wall of the casing 1. A frame 3 is provided in the casing 1. The frame 3 is made up of a top plate 3a which is substantially in the form of a flat plate, and side plates 3b and 3b extended downwardly from both ends of the top plate 3a. A supporting frame 4 as shown in FIG. 3 is provided inside the frame 3. A reproducing means for reproducing music recorded in discs is mounted on the supporting frame 4 substantially at the center. The supporting frame 4 is supported through dampers 5 by the frame 3 in floating manner. A loading mechanism 6 and a loading arm lowering mechanism 7, which are used to move a disc 101 inserted into the disc inserting opening 2 to a predetermined position (substantially the center of the supporting frame 4) are provided through a loading arm 8 on one side of the front end portion of the frame 3. The loading mechanism 6 has a driving roller 9a which is supported by the supporting frame 4. The detailed explanation of loading mechanism 6 and the loading arm lowering mechanism 7, and a lock mechanism 45 (described later) have been described in the specification of Japanese Utility Patent Application No. 136632/1987 in detail. A loading motor 10 is provided in the frame 3 at the front end portion to rotate the driving roller 9a. The driving roller 9a thus rotated delivers the disc 106 inserted into the disc inserting opening 2 to the predetermined position in cooperation with a driven roller 9b engaged with the driving roller 9a.

A centering mechanism 12 (FIG. 3) for positioning the disc 106 at the middle of the disc inserting opening 2 is provided inside the frame 3 and near the disc inserting opening 2. The centering mechanism 12, as shown in FIG. 4, comprises: a pair of centering arms 13 and 14; and a centering lever 15 interposed between with the centering arms 13 and 14.

Each of the centering arms 13 and 14 is substantially L-shaped. Each of the centering arms 13 and 14 has a tip end portion 13a, 14a to be brought into contact with the inserted CD disc 106 and a side end portion 13b, 14b. Each of the centering arms 13 and 14 is pivotally supported about a support pin 16, 17 provided at a center portion 13c, 14c between the tip end portion 13a, 14a, which extends close to the disc inserting opening 2, and the side end portion 13b, 14b. Centering pins 18 and 19 are provided at the tip end portions 13a and 14a so that the pins 18 and 19 are located corresponding to division points P and P for dividing the disc inserting opening 2 into three parts as indicated by l in FIG. 4. Accordingly, it is possible to regard the centering pins 18 and 19 as the contact portions like the tip end portions 13a and 14a. The side end portions 13b and 14b have coupling pins 20 and 21 and are confronted with each other. An engagement piece 131 is formed in the central portion 13c of one centering arm 13 in the front side of the disc insertion direction.

The centering lever 15 is substantially inverted-W-shaped, and has coupling grooves 22 and 23 at both ends. The coupling grooves 22 and 23 are engaged with the coupling pins 20 and 21, respectively, so that the two centering arms 13 and 14 are coupled to the right and left ends of the centering lever 15. The centering lever 15 has a hole 25 which is elongated along the disc inserting direction. The elongated hole 25, as indicated at 25a in FIG. 5, is circular at the end closer to the disc inserting opening 2 (hereinafter referred to as "a circular head hole 25a" when applicable). A guide pin 26 embedded in the frame 3 is loosely fitted in the elongated hole 25 so that it is movable along the elongated hole 25. The middle portion 15c of the centering lever 15 has a guide groove 125 at the other end portion. The guide groove 125 is engaged with a guide pin 126 fixedly embedded in the frame top plate 3a. The middle portion 15c is disposed between a pair of guide protrusions 3c and 3d extended from the frame 3 so that it is guided by the guide protrusions 3c and 3d. Hence, the centering lever 15 is reciprocatingly movable in the disc inserting direction (see arrow X in FIG. 4).

Tension springs 27 and 28 are connected between the centering arms 13 and 14 and protrusions 3b and 3b of the frame 3, respectively, to urge the centering pins 18 and 19 to approach each other. The distance between the centering pins 18 and 19 is set at about 8 cm under the free condition. It is assumed that the small diameter disc 106 is inserted into the disc inserting opening 2 in such a manner that it is shifted sidewards from the middle of the disc inserting opening 2 in the lengthwise direction. In this case, the disc is brought into contact with one of the centering pins 18 and 19. When the disc 106 is brought into contact with the centering pin 18 as shown in FIG. 4, then the centering arm 13 is slightly turned counterclockwise about the supporting pin 16 against the elastic force of the tension spring 27. As a result, the centering lever 15 is slightly turned clockwise as a whole. As the centering lever 15 is turned in this manner, as shown in FIG. 5 the guide pin 26 is caused to move from the center of the circular head hole 25a to abut against the lower left part (in FIG. 5) of the wall of the circular head hole 25a. Accordingly, the guide pin 26 cannot move in the elongated hole 25 relative to the centering lever; that is, the centering lever 15 cannot move towards the disc inserting opening 2. Therefore, the centering arm 13 is slightly swung by the disc 106, but it is not swung further. Thus, the disc 106 shifted sidewards is caused to be positioned at the middle of the disc inserting opening 2, being regulated by &.he centering pin 18.

When the disc 101 is positioned at the middle of the disc inserting opening 2, then it is brought into contact with the two centering pins 18 and 19 at the same time.

In this case, the centering arms 13 and 14 are turned about the supporting pins 16 and 17, respectively, to move both sides of the centering lever 15 towards the disc inserting opening 12 simultaneously. In this case, the guide pin 26 is not shifted in the widthwise direction of the elongated hole 25; that is, it is movable relative to the centering lever in the elongated hole 25. Therefore, the centering lever 15 is moved towards the disc inserting hole 2. As the centering lever 15 is moved in this manner, the centering arms 13 are further turned, so that the disc 101 can be inserted into the vehicle CD player.

As shown in FIG. 3, a turntable 29, on which a disc 106 is mounted, is provided on the supporting frame 4 substantially at the center. The turntable 29 is rotated by a spindle motor 30 provided below the supporting frame 4. A small-disc-shaped clamper 31 is arranged Over the turntable 29. More specifically, the clamper 31 is coupled to the triangular end portion of a clamper arm 32 which is rockably connected to the rear end of the supporting frame 4. A tension spring 33 is connected between the clamper arm 32 and the supporting frame 4 to urge the clamper arm 32 towards the turntable 29.

Figure 6:
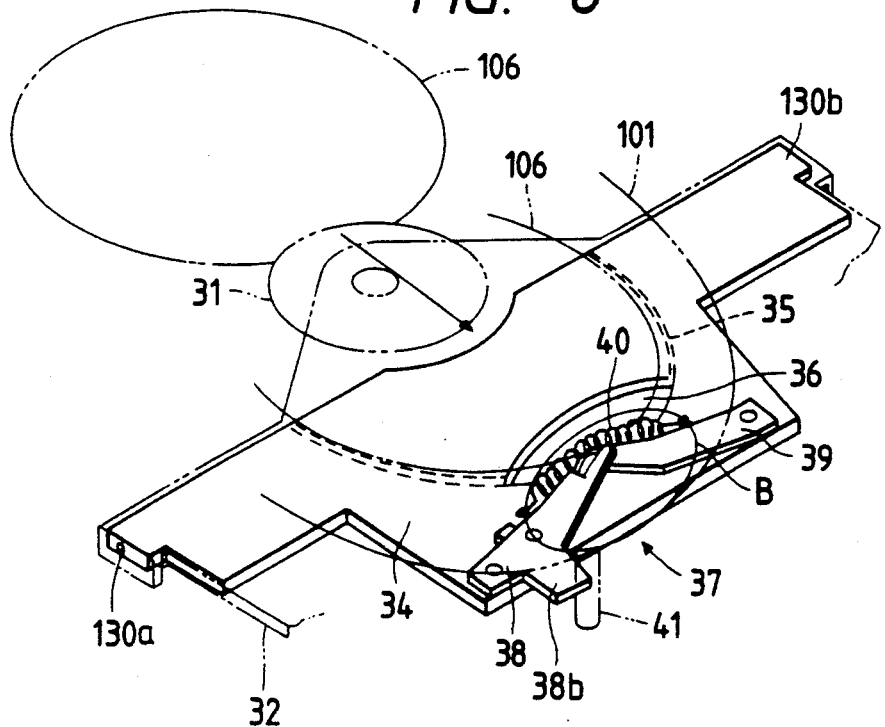
FIG. 6 is a perspective view showing an operating assist board and a depressing assist mechanism.
Figure 7:
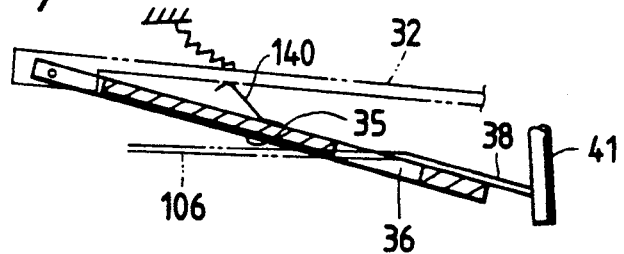
FIG. 7 is a sectional view of the operating assist board and the depressing assist mechanism.

As shown in FIGS. 6 and 7, an operating assist board 34 is provided below the clamper arm 32. When the smaller diameter 8 cm disc 106 is moved and positioned above the turntable 29, the operating assist board 34 operates a detecting pin 41 to mount the disc 106 on the turntable 29. The operating assist board 34 is swingably coupled to the pivot points 130a and 130b provided at both sides of the front end portion of the clamper arm 32, and is urged downwardly by a leaf spring 140. The operating assist board 34 has an arcuate disc recess 35 in the lower surface. The arcuate disc recess 35 is so shaped as to be receive an 8 cm disc. Therefore, when the small diameter disc 106 is moved towards the predetermined position, it is fitted in the disc recess 35. The disc recess 35 has a hole 36 in the rear end portion in such a manner that the hole 36 is confronted with the central portion of a depressing assist mechanism 37 which is provided above the operating assist board 34. Therefore, when the disc 106 is led into the disc recess 35, its end portion abuts against the depressing assist mechanism 37 to operate the mechanism 37 as discussed below.

When the large diameter 12 cm disc 101 is moved to the turntable 29, it is not fitted into the disc recess 35 because it is larger than the latter; that is, it is moved over the disc recess 35 as it is, and it is mounted on the turntable 29 after abutting against the detecting pin 41 with its periphery. When the 12-cm disc 101 has been mounted on the turntable 29, the centering pins 18 and 19 are sufficiently spaced away from the disc because the pins 18 and 19 are positioned sufficiently away from the center of the turntable 29. Accordingly, even if the 12-cm disc 101 is horizontally vibrated on the turntable 29, the centering pins 18 and 19 and the disc will not collide with each other because the centering pins 18 and 19 are located outside the range of vibration.

Figure 8:
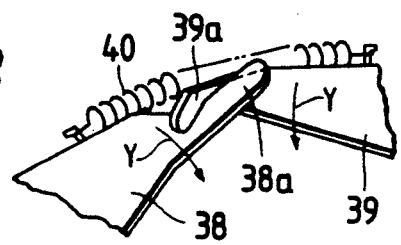
FIG. 8 is an enlarged view of the part B in FIG. 6.

The depressing assist mechanism 37 has a pair of swing arms 38 and 39. The swing arms 38 and 39 are pivotally mounted through their base portions on the operating assist board 34. A tension spring 40 is connected between the swing arms 38 and 39, so that the end portions 38a and 39a thereof are engaged with each other as shown in FIG. 8. When being pushed through the hole 36 by the end portion of the small diameter disc 106, the end portions 38a and 39a are swung as if doors were opened (see arrows Y in FIG. 8). A protrusion 38b is extended from the swing arm 38 in such a manner that it is confronted with the detecting pin 41. Therefore, when the swing arm 38 is swung, the protrusion 38b depresses the detecting pin 41.

Figure 9:
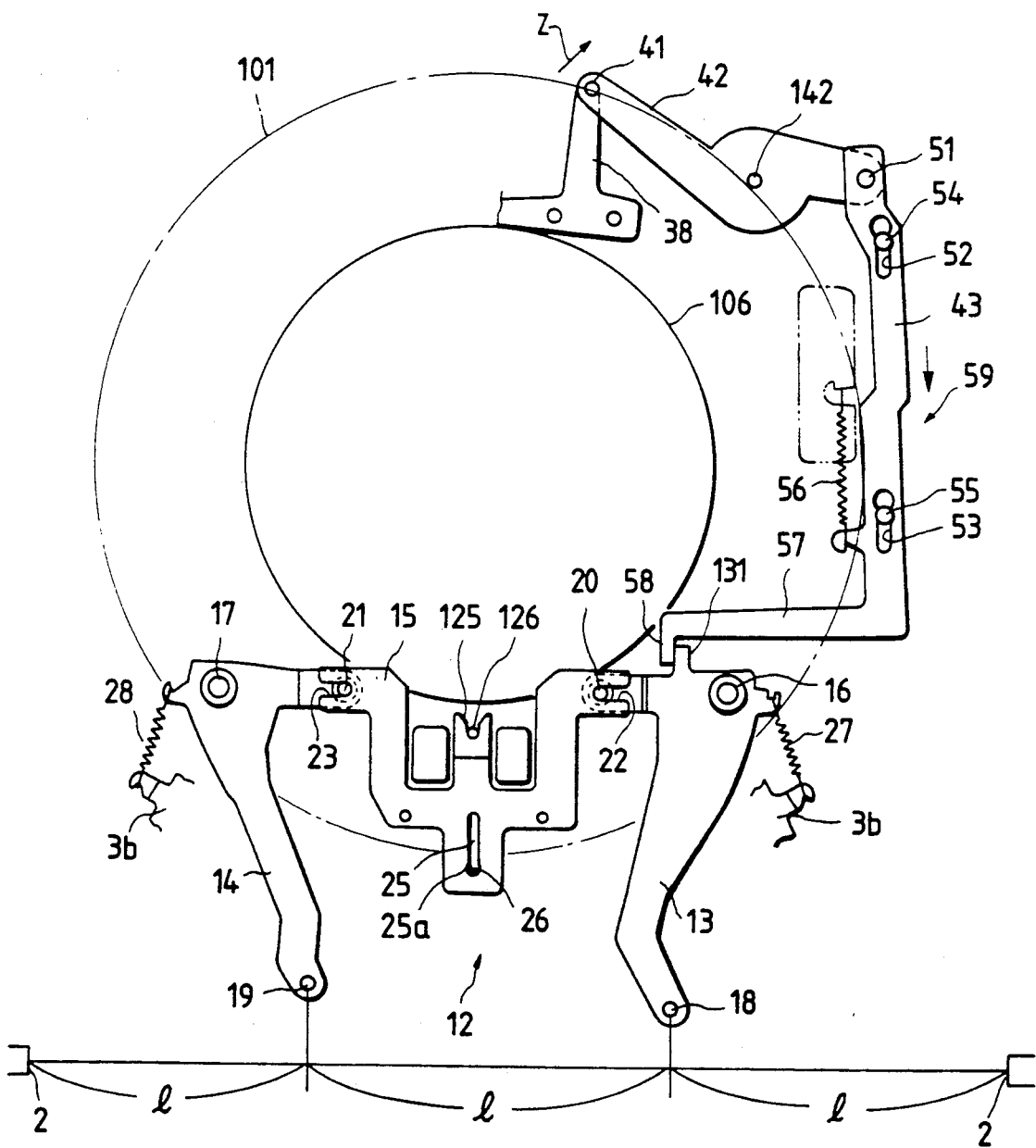
FIG. 9 is a plan view showing first and second links.

As shown in FIG. 9, the detecting pin 41 is embedded in one end portion of a first link 42 which is pivotally mounted on the rear end portion of the frame 3 (see arrow Z in FIG. 9). The other end portion of the first link 42 is coupled through a pin 51 to one rear end portion of a second link 43 which is slidable in the disc inserting direction. These two links 42 and 43 form a link mechanism. The second link 43 has elongated holes 52 and 53. Guide pins 54 and 55 fixed to the frame 3 are engaged with the elongated holes 52 and 53 to thereby guide the second link 43 along the top plate 3a. The second link 43 is biased rearwardly of the frame 3 by a spring 56. A lock arm 57 is provided to extend toward the center of the frame 3 at the disc inserting opening side 2 of the second link 43. An end portion of the lock arm 57 extends toward the centering arm 13 to form a lock claw 58 for engaging with the engagement piece 131.

When the detecting pin 41 is depressed through a swing arm 38 in the case of small diameter disc 106 or is depressed directly by the large diameter disc 101, the second link 43 is slidingly moved to release the lock state of the loading arm swing mechanism (shown in FIGS. 2 and 3) and to allow the loading mechanism to be lowered. At this time, the lock claw 58 is moved toward the engagement piece 131 of the centering arm 13 together with the second link 43 to thereby lock the rotation of the centering arm 13. Namely, the first and second links 42 and 43 are used to release the lock state of the loading arm swing mechanism 7 and to lock the rotation of the centering arm 13 through the lock claw 58 and the like and the rotation of the centering arm 14 through the centering lever 15. For this reason, the first link 42, the second link 43, the lock arm 57, the lock claw 58 and the engagement piece 131 as a whole constitute the arm lock mechanism 59.

On the other hand, as shown in FIGS. 2 and 3, a lock pin 44 is embedded in the side wall of the supporting frame 4 in such a manner as to extend towards the side wall of the frame 3. A locking mechanism 45 is provided on the frame 3 in such a manner that it is confronted with the lock pin 44, so that, until the disc inserted is moved to the predetermined position, the lock pin 44 is locked by the locking mechanism 45, and the supporting frame 4 is secured to the frame 3. As the loading arm 8 is moved downwardly by the loading arm operating mechanism 7, the locking mechanism 45 unlocks the lock pin 44, so that the supporting frame 4 is supported through dampers 5 in a shock absorbing mode.

Now, the operation of the vehicle disc player thus constructed will be described.

The centering mechanism 12 of the invention is effective especially in handling both small and large diameter discs 101 and 106. Therefore, the operation will first be described with reference to the case of a small diameter disc 106.

Upon insertion of a small diameter disc 106 into the disc inserting opening 2, a sensor 47 (FIG. 2) provided on the front end portion of the top plate 3a detects the insertion of the disc 106, to start the loading motor 10. If, in this case, the disc 106 is shifted sidewards from the middle of the disc inserting opening 2, it will abut against one of the pair of centering pins 18 and 19 of the centering mechanism 12, whereupon the disc 106 is positioned at the middle of the disc inserting opening 2 by the centering mechanism: 12 in the above-described manner.

Under this condition, the driving roller 9a, being driven by the loading motor 10, cooperates with the driven roller 9b to convey the disc 106 towards the turntable 29. In this case, the centering arms 13 and 14 take initial positions by the spring forces of the tension springs 27 and 28 and are located at the three-division points of the disc inserting opening 2. When the disc 106 has come near the center of the turntable, it is fitted in the disc recess 35 of the operating assist board 34 (because its diameter is 8 cm). When the disc 106 has been fitted in the disc recess 35, as shown in FIG. 6 the end portion of the disc 106 pushes the detecting pin 41 through the depressing assist mechanism 37 appearing in the hole 36. That is, the swing arm 38 is swung by the disc 106, so that its protrusion 38b pushes the detecting pin 41.

When the detecting pin 41 is pushed in this manner, as shown in FIG. 8 the first link 42 is swung about the pin 142, thereby to slide the second link 43 to activate the loading arm operating mechanism 7. As a result, the side protrusion 32a of the clamper arm 32 is moved downwardly by the elastic force of the tension spring 33 as the pin 150 is moved downwardly together with the loading arm 8 as shown in FIG. 2, whereby the disc 106 mounted on the turntable 29 is fixedly positioned thereon by the clamper 31. Namely, the loading arm swing mechanism 7 serves also as a clamper arm activating mechanism for holding the clamper arm 32 at the raised position. While the disc 106 is fixedly held by the clamper 31, in association with the operation of the loading arm operating mechanism 7 the locking mechanism 45 unlocks the lock pin 44, so that the supporting frame 4 is supported through the dampers 5 by the frame 3 in a shock absorbing mode; that is, it is supported in floating manner. Thus, the preliminary operation for reproduction has been accomplished. Under this condition, the spindle motor 30 is operated to rotate the disc 106 through the turntable 29. When the disc 106 is rotated in this way, the reading head (not shown) applies a laser beam to the disc. As the reading head moves radially of the disc 106, the pieces of music recorded in the disc are reproduced.

In general, there is no fear, during the playback operation in which the disc 106 is fixed onto the turntable 29 and the spindle motor 30 is driven to rotate the turntable 29 for reproducing the recorded music of the disc 106, that another disc will be inserted into the disc inserting opening 2. However, in the case where the reproduction of the music is temporarily stopped and the disc 106 is left on the turntable 29, the operator sometimes forgets the fact that the disc 106 is laid on the turntable 29. For this reason, if another disc is erroneously inserted into the disc inserting opening under the condition that the disc 106 is laid on the turntable 29, the disc and the CD player would be damaged.

Accordingly, the double insertion is prevented by the centering mechanism 12 as shown in FIG. 9. More specifically, the disc 106 inserted into the disc inserting opening 2 is positioned at the center by the centering mechanism 12, and thereafter, the disc is delivered toward the turntable 29. However, the centering arms 13 and 14 of the centering mechanism 12 are returned back to the initial positions by the tension springs 27 and 28 after the disc has passed through the centering mechanism 12.

Furthermore, when the disc 106 is transferred and laid on the turntable 29 in the stationary manner, the disc pushes the detecting pin 41 as described above and the second link 43 is slidingly moved toward the disc inserting opening 2. When the second link 43 is moved, the lock claw 58 is close to and engaged with the engagement piece 131 of the centering arm 13 through the lock arm 57. When the lock claw is engaged with the engagement piece 131, the rotation of the centering arm 13 is locked, and at the same time, the rotation of the centering arm 14 is also locked through the centering lever 15.

For this reason, under the condition that the disc 106 is fixed to the turntable 29, even if another disc would be inserted into the disc inserting opening 2 in an erroneous manner, the centering pins 18 and 19 serve as a conventional double insertion preventing mechanism. Thus, the additional disc insertion is prevented by the centering pins 18 and 19. Accordingly, the damage of the disc and the CD player may be prevented.

Also, by utilizing the centering mechanism 12 and the conventional first link 42 and the second link 43, the conventional double insertion preventing member and the drive means therefor may be dispensed with. It is thus possible to reduce the cost of the CD player as a whole. Also, the additional functions are imparted to the centering mechanism and the first and second links, to thereby simplify the structure of the CD player, which leads to the high. reliability in operation.

Incidentally, when the disc 106 fixed to the turntable 29 is discharged from the disc inserting opening 2, the disc 106 allows the detecting pin 41 to be released. Accordingly, the second link 43 is slidingly moved toward the disc inserting direction by the spring force of the tension spring 56. When the second link 43 is slidingly moved in the disc inserting direction, the lock claw 58 is disengaged from the engagement piece 131, the centering arms 13 and 14 may be rotated. For this reason, the disc 106 is delivered by the drive roller 9a and the driven roller 9b toward the disc inserting opening 2. The disc is discharged while opening the centering arms 18 and 19. These series operation is performed in the same manner for the large diameter disc 101. Also, it is possible to modify the lock mechanism so that the centering lever 15 is locked by the lock claw 58 instead of the centering arm 13.

As described above, according to the present invention, since the centering mechanism is provided in the middle of the disc inserting opening, even if the disc is inserted to be shifted sidewise the disc may be limited and guided to the center of the disc inserting opening by the centering pins. Thus, the disc is located on the turntable in a positive stationary manner. The disc may be reproduced by the reading head.

Also, the double inserting operation may be well avoided by utilizing the centering mechanism and the link mechanism.

We claim:

1. A disc player comprising:
   a casing having a disc inserting opening;
   a turntable driven by a spindle motor;
   a clamper arm operating means for operating a clamper arm in cooperation with said turntable;
   a centering means for guiding a disc from said disc inserting opening onto said turntable; said centering means including a pair of centering arms each having at distal end portions contact portions which are to be brought into contact with a circumferential edge of the disc, said centering arms being pivotally movable at a predetermined distance in the disc inserting opening;

detecting means for detecting a condition that the disc is laid on at a predetermined position within said casing; and disc double insertion preventing lock means for preventing another disc from being inserted into said casing through said disc inserting opening when the first-mentioned disc is already located at the predetermined position within said casing, said double insertion preventing lock means comprising a linkage mechanism for mechanically linking said detecting means with said centering means, wherein after the first-mentioned disc has passed through said centering means, said centering arms are returned back to an initial position such that said contact portions are closer together; and further wherein said double insertion preventing lock means is operative to lock said centering arms such that said contact portions are locked in the initial position, thereby to prevent the insertion of another disc.

2. The disc player according to claim 1, further comprising a centering lever means for allowing said pair of centering arms to be pivotally opened when the circumferential edge of the disc is simultaneously brought into contact with said contact portions of said centering arms and for locking said pair of centering arms when the circumferential edge of the disc is brought into contact with only one of said contact portions of said centering arms.

3. A disk player comprising:
a casing having a disc inserting opening;
a turntable driven by a spindle motor;
a clamper arm operating means for operating a clamper arm in cooperation with said turntable;
a centering means for guiding a disc from said disc inserting opening onto said turntable; said centering means including a pair of centering arms each having at distal end portions contact portions which are to be brought into contact with a circumferential edge of the disc, said centering arms being pivotally movable at a predetermined distance in the disc inserting opening;
detecting means for detecting a condition that the disc is laid on at a predetermined position within said casing; and
disc double insertion preventing lock means for preventing another disc from being inserted into said casing through said disc inserting opening when the first-mentioned disc is already located at the predetermined position within said casing, said double insertion preventing lock means comprising a linkage mechanism for mechanically linking said detecting means with said centering means, wherein said linkage mechanism includes a first link and a second link, said first link is pivotally coupled to said detecting means and said second link has a claw for engaging with said centering means.

4. The disc player according to claim 3, wherein said contact portions of said centering arms are located corresponding to points at which said disc inserting opening is equally divided into three parts, when said centering means is locked.

5. A disk player comprising:
a casing having a disc inserting opening;
a turntable driven by a spindle motor;
a clamper arm operating means for operating a clamper arm in cooperation with said turntable;
a centering means for guiding a disc from said disc inserting opening onto said turntable; said centering means including a pair of centering arms each having at distal end portions contact portions which are to be brought into contact with a circumferential edge of the disc, said centering arms being pivotally movable at a predetermined distance in the disc inserting opening;
detecting means for detecting a condition that the disc is laid on at a predetermined position within said casing; and
disc double insertion preventing lock means for preventing another disc from being inserted into said casing through said disc inserting opening when the first-mentioned disc is already located at the predetermined position within said casing, said double insertion preventing lock means comprising a linkage mechanism for mechanically linking said detecting means with said centering means;
further comprising a centering lever means for allowing said pair of centering arms to be pivotally opened when the circumferential edge of the disc is simultaneously brought into contact with said contact portions of said centering arms and for locking said pair of centering arms when the circumferential edge of the disc is brought into contact with only one of said contact portions of said centering arms; wherein said linkage mechanism includes a first link and a second link, said first link is pivotally coupled to said detecting means and said second link has a member for engaging with said centering lever means.

6. The disc player according to claim 5, wherein said contact portions of said centering arms are located corresponding to points at which said disc inserting opening is equally divided into three parts, when said centering lever means is locked.

7. A disc player comprising:
a casing having a disc inserting opening;
a turntable driven by a spindle motor;
a clamper arm operating means for operating a clamper arm in cooperation with said turntable;
a centering means for guiding a disc from said disc inserting opening onto said turntable; said centering means including a pair of centering arms each having at distal end portions contact portions which are to be brought into contact with a circumferential edge of the disc, said centering arms being pivotally movable at a predetermined distance in the disc inserting opening;
detecting means for detecting a condition that the disc is laid on at a predetermined position within said casing; and
disc double insertion preventing lock means for preventing another disc from being inserted into said casing through said disc inserting opening when the first-mentioned disc is already located at the predetermined position within said casing, said double insertion preventing lock means being in cooperation with said centering means, wherein said double insertion preventing lock means includes a linkage means having a first link and a second link, said first link is pivotally coupled to said detecting means and said second link having a claw for engaging with said centering means.

8. The disc player according to claim 7, wherein said contact portions of said centering arms are located corresponding to points at which said disc inserting opening is equally divided into three parts, when said centering means is locked.

9. A disc player comprising:
a casing having a disc inserting opening;
a turntable driven by a spindle motor;
a clamper arm operating means for operating a clamper arm in cooperation with said turntable;
a centering means for guiding a disc from said disc inserting opening onto said turntable; said centering means including a pair of centering arms each having at distal end portions contact portions which are to be brought into contact with a circumferential edge of the disc, said centering arms being pivotally movable at a predetermined distance in the disc inserting opening;
detecting means for detecting a condition that the disc is laid on at a predetermined position within said casing; and
disc double insertion preventing lock means for preventing another disc from being inserted into said casing through said disc inserting opening when the first-mentioned disc is already located at the predetermined position within said casing, said double insertion preventing lock means being in cooperation with said centering means;
further comprising a centering lever means for allowing said pair of centering arms to be pivotally opened when the circumferential edge of the disc is simultaneously brought into contact with said contact portions of said centering arms and for locking said pair of centering arms when the circumferential edge of the disc is brought into contact with only one of said contact portions of said centering arms;
wherein said double insertion preventing lock means includes a linkage means having a first link and a second link, said first link is pivotally coupled to said detecting means and said second link having a member for engaging with said centering lever means.

10. The disc player according to claim 9, wherein said contact portions of said centering arms are located corresponding to points at which said disc inserting opening is equally divided into three parts, when said centering lever means is locked.

* * * * *